Figure 1:
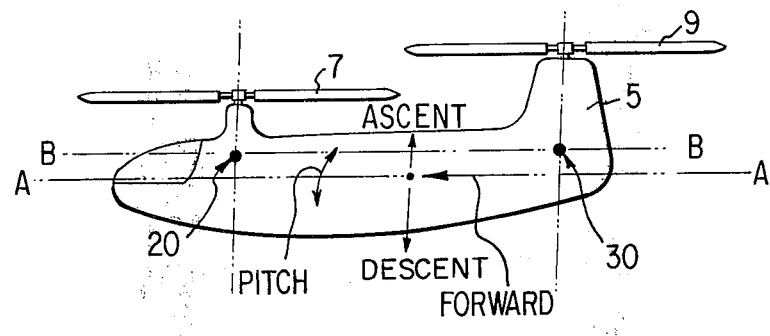

United States Patent [19]

Kolwey

[11] 3,905,565

[45] Sept. 16, 1975

[54] TILT AXIS DUAL ROTOR HELICOPTER AND CONTROL SYSTEM

[76] Inventor: Herman Gopp Kolwey, 103 Elm Ct., Lexington Park, Md. 20653

[22] Filed: Sept. 27, 1973

[21] Appl. No.: 401,149

[52] U.S. Cl. .......... 244/17.23; 244/17.25; 416/148; 416/130
[51] Int. Cl. ............................................. B64c 27/08
[58] Field of Search........... 244/17.11, 17.23, 17.25, 244/17.27, 83 R, 83 A, 7; 416/102, 148, 130, 121, 120, 170; 74/479, 471 R

[56] References Cited
UNITED STATES PATENTS

| | | | |
|---|---|---|---|
| 1,672,276 | 6/1928 | Nordberg............................ | 416/121 |
| 2,233,747 | 3/1941 | Riedl................................... | 416/121 |
| 2,552,864 | 5/1951 | Piasecki............................ | 244/17.23 |
| 2,629,568 | 2/1953 | Crashere et al.................. | 244/17.23 |
| 2,886,261 | 5/1959 | Robert et al..................... | 244/17.25 |
| 2,972,327 | 2/1961 | Paul.................................... | 115/1 C |
| 3,118,504 | 1/1964 | Cresap.............................. | 244/17.25 |
| 3,141,668 | 7/1964 | Nicholson........................... | 416/130 |
| 3,176,936 | 4/1965 | Howard et al....................... | 74/471 |

*Primary Examiner*—Trygve M. Blix
*Assistant Examiner*—Galen Barefoot
*Attorney, Agent, or Firm*—Gardiner, Sixbey, Bradford and Carlson

[57] ABSTRACT

A dual rotor helicopter is comprised of rotor supports tiltable about a line or lines parallel to the longitudinal axis of the vehicle. The rotor blades are mounted for free tilting with respect to each rotor about their own vertical axes so that only two controls are required to produce pitch, roll, and yaw of the vehicle. Altitude, (i.e., rate of climb) and speed are controlled by input speed to the rotors coupled with collective pitch control which is one of the two mentioned controls.

The conventional and complicated swashplate is eliminated and a simplified power transmission and collective system is used.

4 Claims, 9 Drawing Figures

TILT AXIS DUAL ROTOR HELICOPTER AND CONTROL SYSTEM

The subject matter herein disclosed and claimed is the subject of a royalty-free, non-exclusive license to the Government of the United States as represented by the Department of Defense.

BACKGROUND OF THE INVENTION

Despite their common acceptance as a mode of transportation, a war weapon, a mercy vehicle and an emergency vehicle, helicopters are a highly complex, high maintenance type of aircraft. Aside from the usual complicated systems normally found in fixed wing aircraft, the helicopter complexity is further increased by the necessity for use of complicated control systems and blade control mechanisms to produce control of the aircraft about its three axes, pitch and roll, yaw, as well as provide for variations in speed and changes in altitude or elevation. Also, since helicopters use two rotors regardless of whether it is a maintail rotor combination, i.e., so-called single rotor helicopter or two main rotors, i.e., so-called tandem rotor helicopter, or other configuration such as co-axial, laterally displaced, etc., the aircraft must be provided with complicated or expensive drive trains for transfer of power, in correct proportion, to the twin rotors.

In conventional helicopter aircraft the usual practice is to mount the lift sustaining rotor or rotors on a vertical shafting assembly so that the blades of the rotor always rotate about a fixed vertical axis. Such a conventional arrangement and details of the controls and the rotor head are shown for example in Jovanovich U.S. Pat. No. 2,753,004. A typical power train and rotor control system for tandem rotor aircraft is shown, by way of example, in Campbell U.S. Pat. No. 2,659,551. Note also Lightfoor U.S. Pat. No. 2,669,313 showing in great detail a rotor head assembly and controls therefor.

With the development of the helicopter being of great interest in the early days of aviation into the mid-forties and early fifties, a number of various alternative flight and control systems proposed for rotary winged aircraft, were explored and are illustrated in issued patents. For example, Perrin U.S. Pat. No. 1,491,310 illustrates a tandem rotor helicopter wherein the rotors are tiltable about their respective vertical axes to control the attitude of the aircraft. Dyer et al. U.S. Pat. No. 2,163,728 illustrates a similar approach as does Kaplan U.S. Pat. No. 3,008,524, and Alde U.S. Pat. No. 2,589,030. Unfortunately none of the disclosed tilt rotor systems has attained any great measure of success for one reason or another and each adds even more complications in control systems, drive trains, etc., found on more conventional types of aircraft.

THE INVENTION

The present invention deals with tandem rotor, tiltable axis helicopters. In particular, the invention deals with a tandem rotor helicopter in which the rotors are controlled by a much simplified control system and wherein, because of the simplification of the controls and, also the power transmission system, the invention has definite application to model helicopters as well as man-carrying aircraft.

As will be apparent, the invention provides for control of the aircraft by a collective control and a tilt angle control to the respective rotor heads and for a mixing of control functions, one for mixing collective and longitudinal control inputs to achieve vertical and pitch controls and one for mixing lateral and directional inputs to achieve roll and yaw control by a relatively simple arc to linear mechanical mixer. The control function is generated by control inputs to the standard cyclic, collective, and rudder pedal controls and thus is compatible with present-day piloting techniques.

Figure 2:
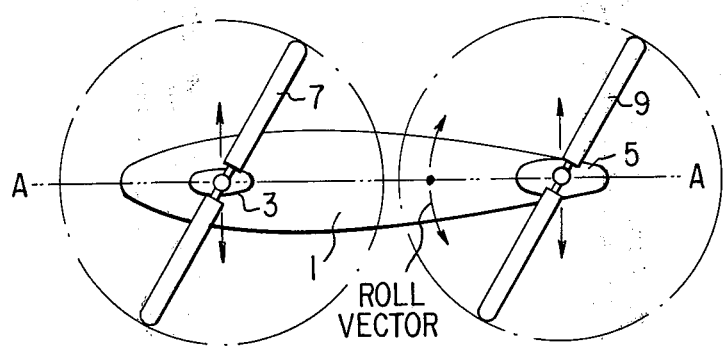
Figure 3:
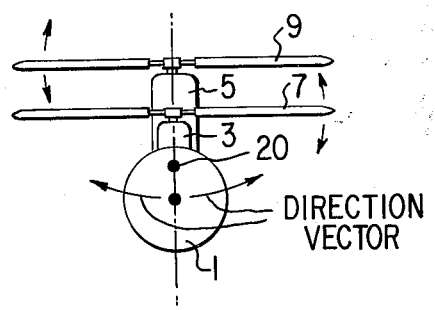
Figure 4:
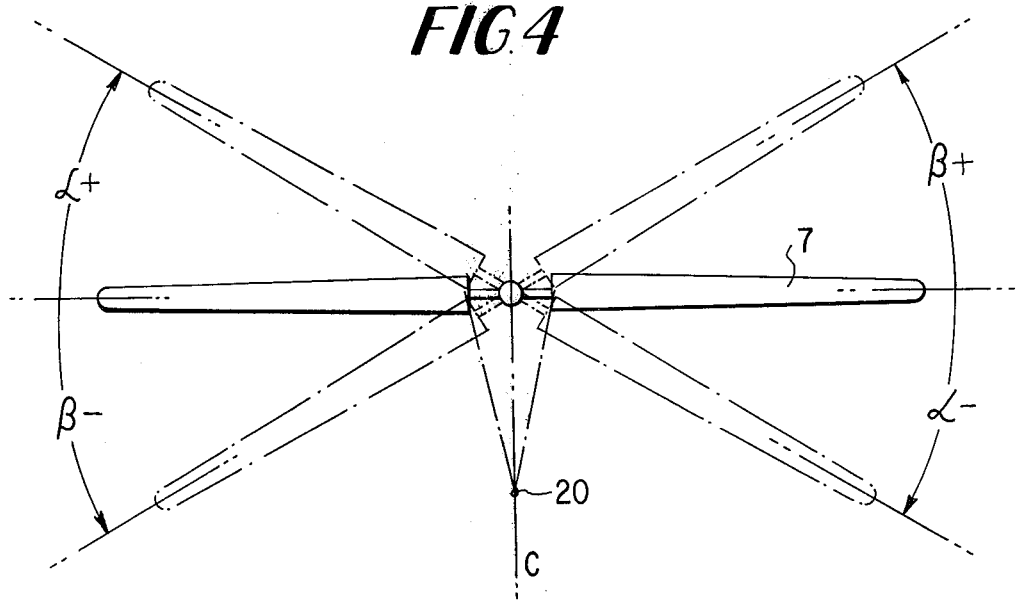
Figure 7:
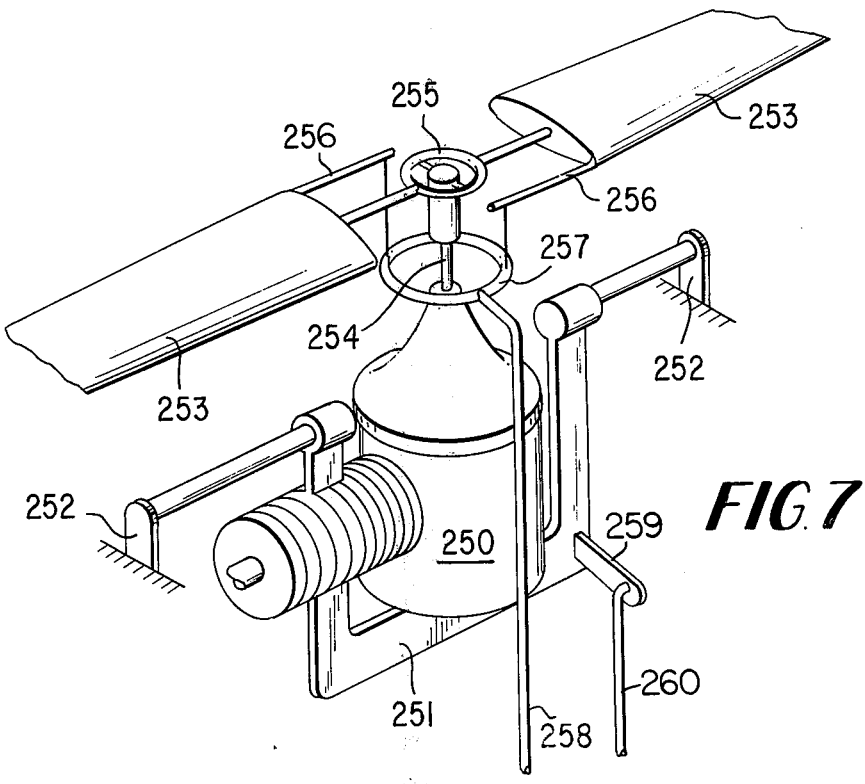
Figure 5:
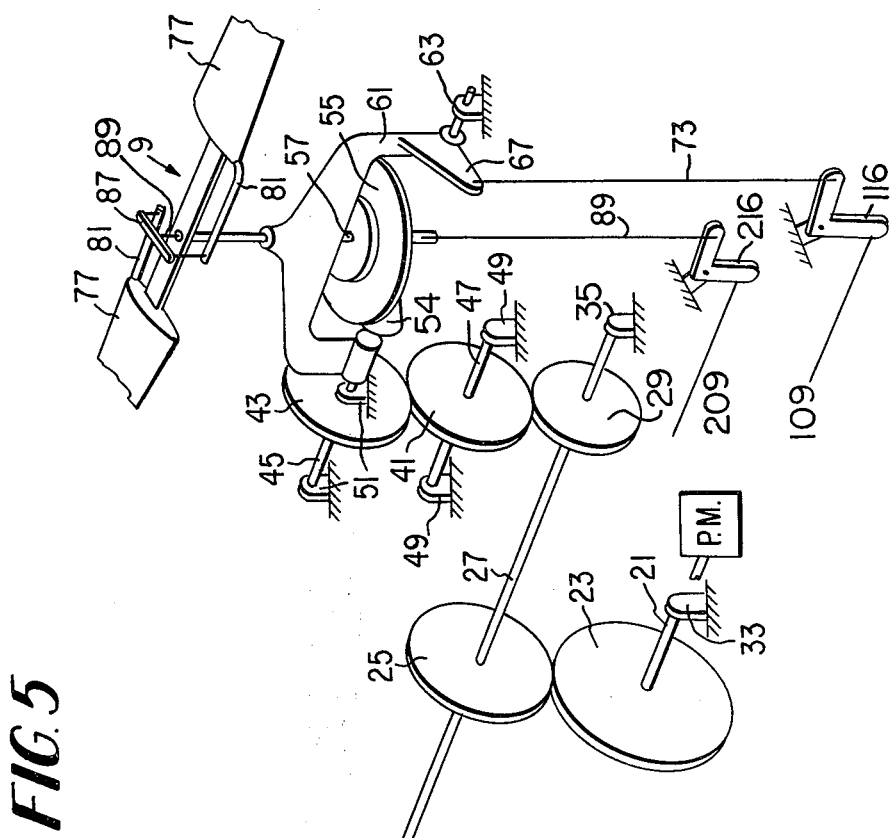
Figure 5:
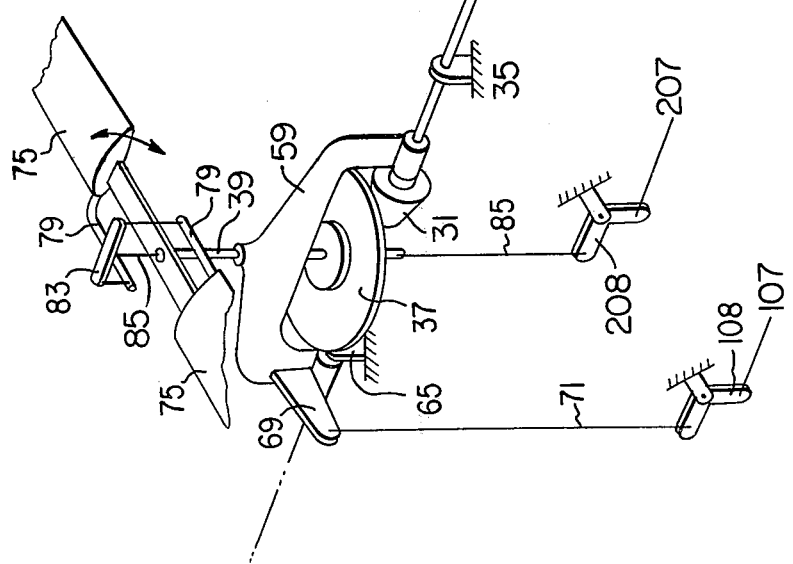
Figure 6A:
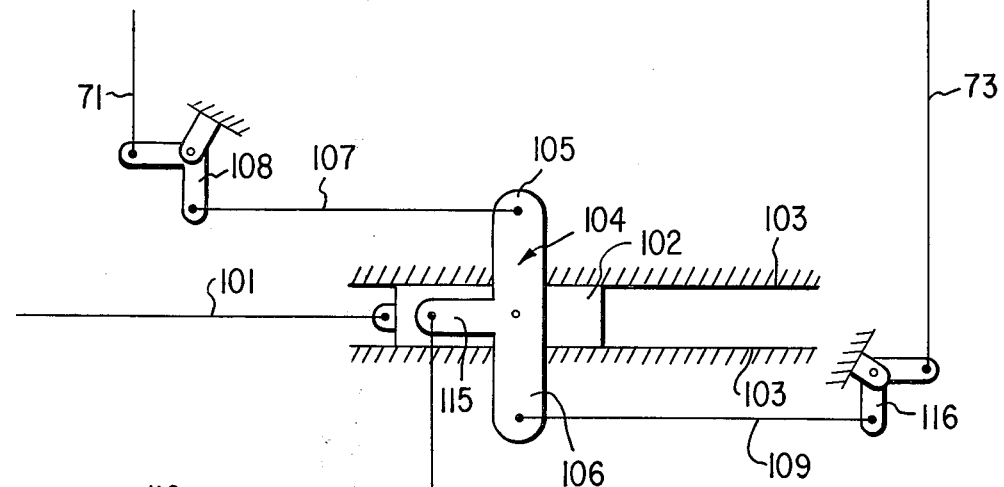
Figure 6B:
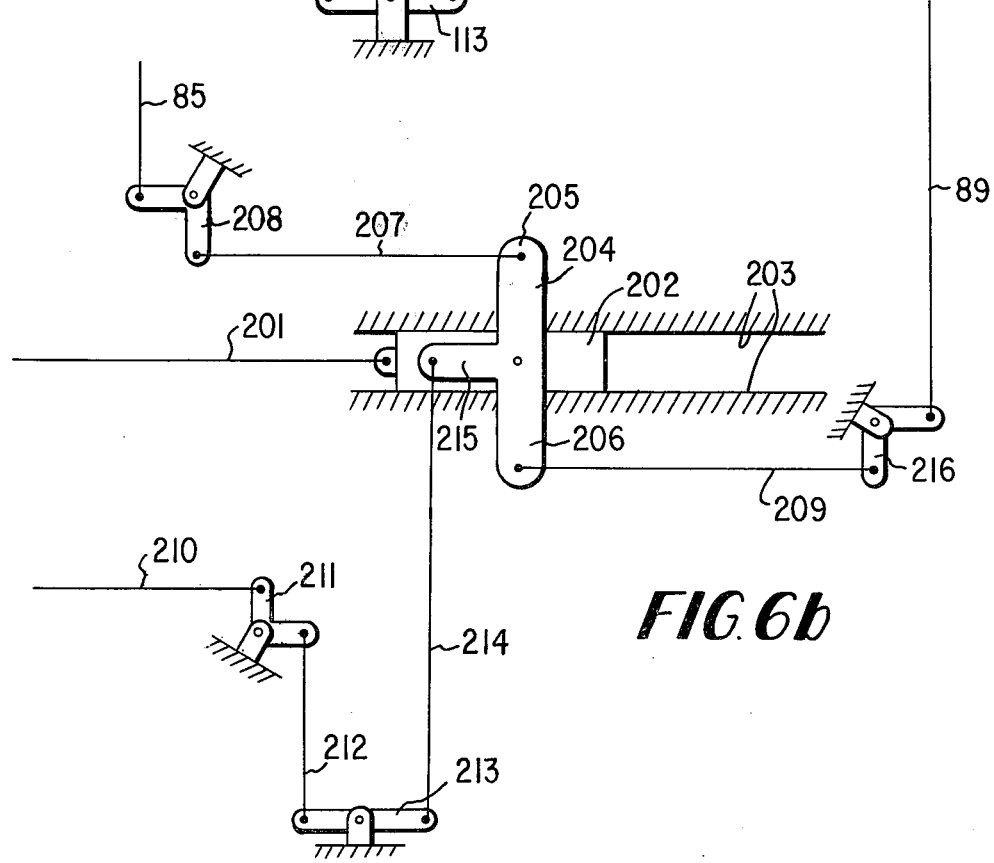
Figure 8:
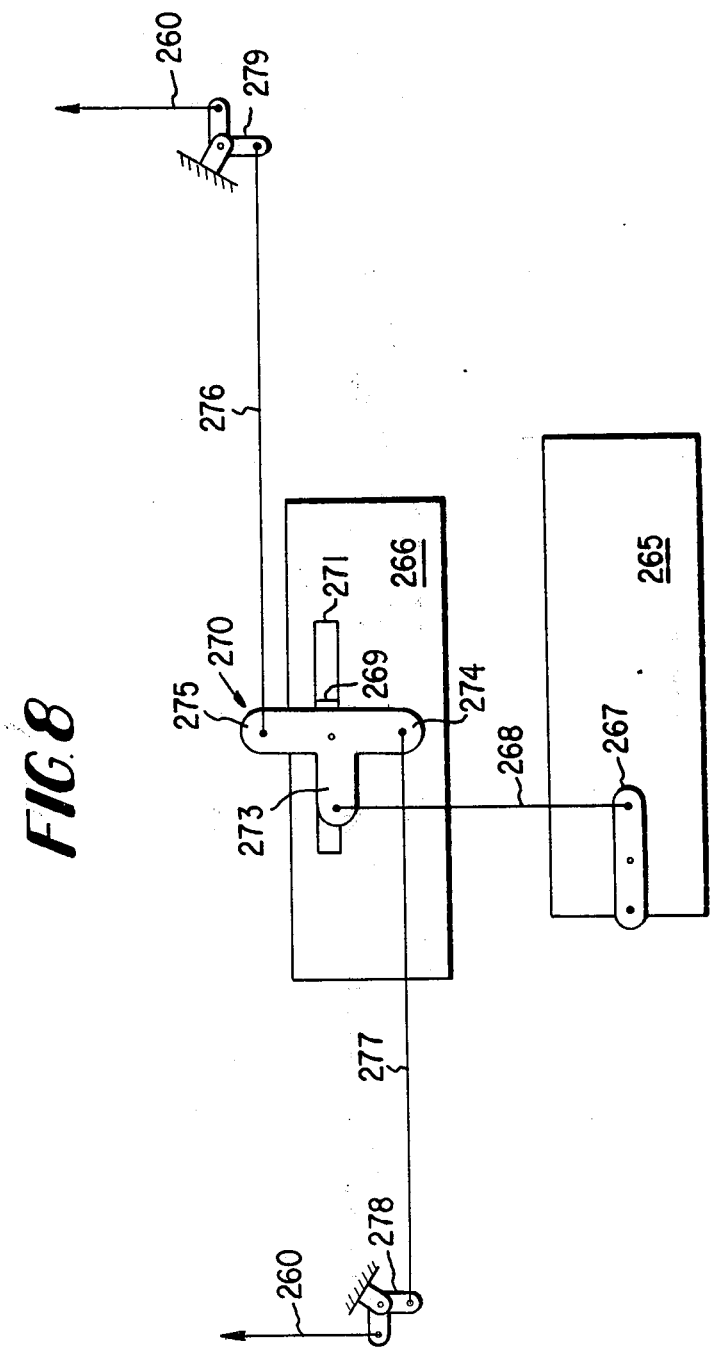

The invention will be more clearly understood from the following detailed description, reference being made to the drawings forming an integral part thereof and wherein:

FIG. 1 is an outline side view of a tandem rotor helicopter showing the tilt axis for the rotors in a fore and aft direction, FIG. 2 is an outline top view of the helicopter shown in FIG. 1 showing the tilt vectors for the rotors both fore and aft and laterally of the longitudinal axis of the aircraft, FIG. 3 is a front view similar to FIG. 1 showing the lateral tilt axis for the rotors, FIG. 4 is a schematic view showing the effect of tilting the rotor axis, FIG. 5 is a schematic veiw of a simplified drive train and control input connections to the rotor heads, FIG. 6a is a schematic view of a portion of a control system for manned aircraft, specifically a roll/yaw mixer, FIG. 6b is a view of the remaining complimentary control system applied to manned aircraft, specifically a pitch/collective mixer, FIG. 7 is a schematic view of a portion of a drive and control system as might be applied to radio controlled model or toy aircraft, and FIG. 8 is a schematic view of a radio-operated servo control system for use with the drive system of FIG. 7.

Turning now to FIG. 1, a tandem rotor helicopter embodying the invention includes the usual fuselage 1 surmounted by two pylons 3 and 5, atop of which are positioned rotors 7 and 9. Preferably, though not necessarily, the rotors 7 and 9 rotate in their neutral position in planes which are spaced one above the other and are both parallel to the plane in which the longitudinal axis of the aircraft lies. The rotor blades 9 and 7 may be of such a diameter that there is no blade tip overlap, or the usual practice of overlapping a forward counter-clockwise rotating and a rearward clockwise rotating rotor with proper syncronization, may be followed.

As illustrated in FIGS. 1 to 3 and as will become apparent, the rotor blades 7 and 9 are so mounted on the pylons 3 and 5 as to be shiftable relative thereto laterally of the longitudinal axis of the aircraft. The lateral shiffting as accomplished by mounting the rotors for pivoting about pivot points 20 and 30 both of which lie along a horizontal axis B—B which lies in a plane parallel to the plane in which the longitudinal axis A—A of the aircraft is disposed. The structural details between pylons and fuselage and/or pylons 3 and 5 and the rotor assemblies from no part of the invention since it sufficies to say that the contruction of the pylons is such as to permit the axis of rotation of the rotors to be tilted laterally, i.e., transverse to the longitudinal axis B—B at will during operation of the aircraft for purposes as will become apparent.

Referring now to FIG. 4, it may be seen in this schematic diagram that rotor 7, by way of example, consisting of two diametrically opposed blades is so mounted on their support, i.e., on their axis of rotation C—C that they may tilt freely about a pivot point 20, independently of any inclination of the axis C—C from the vertical. The blades of rotor 7 or alternatively, the rotor 7, tilts as a unit, about a teeterinng or flapping hinge line 30, as indicated by the arrows, so that as one blade is elevated about a neutral or horizontal plane extending transversely through said axis C—C by the angle the diametrically opposite blade is depressed through an equal but opposite degree of angular tilt below said plane of neutral rotation by the same angle and vice versa through the angles B+ and B— respectively. Since the amount of roll control power is a function of the offset of the rotor thrust vector from the vertical, it is desireable to maximize this offset value for a given thrust and angular displacement of the rotor. In other words the closer the pivot point 20 is to the rotor per se, the greater the offset of the thrust vector and control power. Thus control of the blades of rotor 7, and/or the rotor itself is achieved through tilting of the rotor support structure. Again, the specific yoke structure permitting of this tilting of the blade per se, of rotor 7 forms no part of the present invention and need not be discussed in greater detail at this point but reference to U.S. Pat. No. 2,652,898 discloses a useable blade pivot means. It should be noted that the mounting of rotor 9 for pivotal movement about its vertical axis of rotation is the same as disclosed in FIG. 4 as regards rotor 7.

Turning now from the general views of FIGS. 1 to 4, consideration of FIG. 5 reveals that a common drive and control system is provided for the tandem rotors 7 and 9.

As shown in schematic form the system includes a power plant P.M. which may be of any conventional form including reciprocating internal combustion engine, jet engine or even an electric motor.

The output shaft 21 from the prime mover drives a gear 23 which in turn meshes with and drives a gear 25 mounted on a split torque shaft 27, so called because its output is divided between a gear 29 and a pinion gear 31. The terminal end of shaft 21 is fixed by any suitable journal means 33 to a stationary part of the aircraft. A similar journal or plurality of journal means 35, as the case may be, fixes the remaining length of the shaft 27 in its stationary position.

The pinion gear 31 meshes with and drives a ring gear 37 mounted on a hollow drive shaft 39. Shaft 39 is in turn connected to the blades of rotor 7 as will be described and serves as the rotary drive means therefor.

As is further shown in FIG. 5, the gear 29 meshes with an idler gear 41 and finally with a helical gear 43 mounted on a shaft 45. Each of the gears are mounted on shafts which are fixed to the airframe or fuselage so as to be immobile with respect thereto, shaft 21 in journal 33, shaft 47 in journals 49, 49', shaft 45 in journals 51 51'.

As is also clearly disclosed, shaft 45 carries at its terminal end a pinion gear 54 which meshes with a ring gear 55. Gear 55, in turn, is carried on and drives a hollow drive shaft 57 which, in turn, drives the blades of rotor 9. The blades of the rotor are pivotally connected to shaft 57 for tilting relative thereto in the same conventional fashion as the blades of rotor 7 tilt about and are driven by its driving shaft 39. It should also be noted that rotor 9 turns in the opposite direction of rotation to the direction of rotation of rotor 7.

As is illustrated, the pinion gears 31 and 54 are carried by shafts 27 and 45 each of which defines a pivot axis about which may pivot a pair of rotor head yokes 59 and 61 which are journaled on these shafts and also on trunnions 65, and 63 respectively, both of which are suitably anchored to the airframe. The hollow rotor driving shafts 39 and 57 are mounted in these head yokes and thus may pivot or rock about the two shafts respectively, both of which lie on axes parallel to the longitudinal axis of the vehicle. Thus, the rotors 7 and 9 may be tilted from side to side so that they may develop force vectors affecting roll and direction yaw of the vehicle as will be described more in detail subsequently.

As clearly shown in FIG. 5, the position of each rotor head yoke 59 and 61 is dictated by outwardly extending lever arms 67 and 69 fixed integrally thereto and in turn connected to control rods 71, 73 which will be described in detail in connection with FIG. 7.

As is shown further in FIG. 5, in schematic form, the blades 75, 77 of the rotors 7 and 9 are mounted for further pivotal movement about their own longitudinal axes to provide for a change in feathering. Further, each blade is provided with a pitch control lever 79, as shown on blades 75 and 81, as shown on blades 77. Pitch control arms 79 are connected to pitch collective arm 83 in turn connected to a push-pull control rod 85 which extends from the interior of the aircraft through the hollow rotor drive shaft 39.

Similarly, the pitch control levers 81 are suitably connected to pitch collective arm 87 which, in turn is connected to push-pull control rod 89 which extends from the interior of the aircraft upwardly through the hollow rotor drive shaft 57.

As is readily apparent movement of the push-pull control rods 85, 89 along their respective vertical axes is translated into rotation of the blades 75 and 77 about their own respective longitudinal axes to change the pitch of the blades.

Having described the rotor drive and mounting arrangement, consideration will now be given to the control system whereby the aircraft is maneuvered with respect to its various axes. Such a system is shown in FIG. 6a and 6b, it being understood that the various control inputs are derived from movement of conventional helicopter control operators, i.e. rudder pedals, the fore and aft control stick, and the simultaneous or mean pitch lever. The fore and aft control stick, which is the primary control organ, also moves laterally to the right and left and thus controls the roll or banking of the aircraft. A typical example of such controls is shown in Campbell U.S. Pat. No. 2,659,551 albeit the control system itself differs in the manner of rotor control as will become apparent as the description of the instant system continues.

The directional or rudder control is conveyed by a conventional push-pull rod 101 as shown on FIG. 6a which is connected to a slide 102 mounted at some protected point in the fuselage in slide guides 103. The slide moves linearly in response to fore and aft input from rod 101.

Mounted on slide 102 is a T-shaped, double-acting bell crank 104 having equally dimensioned arms 105 and 106. Arm 105 is connected by control push-pull rod 107 to a further simple bell crank 108 which in turn is connected to the control rod 71, shown in both FIGS. 5 and 6 and previously described with reference to FIG. 5. The arm 106 of the T-shaped bellcrank is connected by push-pull rod 109 to a simple bell crank 116 which is directly connected to control rod 73, also shown in FIG. 5 and previously described in reference to FIG. 5.

The roll control is transmitted from the primary control organ via push-pull control rod 110 through a simple bell crank 111, control rod 112 to a simple first class lever 113, with the pivoting input being via control rod 114 to the base leg or arm 115 of the T-shaped bell crank 104. It can be seen that control rods 107 and 109 receive inputs and subsequently control rod 71 and 73 from both the directional control pedals and the lateral control stick.

Consideration of FIG. 6a in conjunction with FIG. 5 will show that as the rudder pedals are operated to produce fore and aft motion of the slide 102. This motion is transmitted as differential tilting of the rotors about their respective longitudinal axes of tilt. As a result of this tilt the tip path planes of the rotors will be tilted since due to the gyroscope effect and aerodynamic damping the blades tend to rotate in plane which is always perpendicular to their axes of rotation. The net result is that lateral force components are brought to bear which causes the aircraft to yaw. Thus directional control of the vehicle is effected through control of the rudder pedals which transmit linear motion through push-pull control rod 101, slide 102, T-shaped bell crank 104, push-pull rods 71 and 73 moving in opposite directions by the movement of control rods 107 and 109, and bell cranks 108, 116. The push-pull rods, in turn, acting through levers 67, 69 cause the rotor heads to be tilted due to rotary motion of yokes 59 and 61 about their respective pivot axes.

Roll of the aircraft about its longitudinal axis, is affected by lateral movement of the primary control stick which is translated into linear movement of control rod 110. Rod 110 rotates bell crank 111 and the motion is transmitted via push-pull rod 112 to the first class lever 113 and thence to control rod 114 to the base arm 115 of the slider mounted T-shaped bell crank 104 causing the crank to rotate on the slider 102. Rotation of the T-shaped bell crank causes simultaneous tilt of the fore and aft rotor heads with the result that simultaneous lateral vectors are induced by the rotors causing the aircraft to roll about its longitudinal axis and to translate in the direction of lateral movement of the control stick. Obviously by coordination of the primary control stick and the rudder pedals a control "mixing" is effected such that the aircraft may be maneuvered in turns and direction of flight, or can be rolled and yawed in the conventional manner.

Turning now to FIG. 6b a control system for longitudinal and vertical control of the aircraft is disclosed. Basically this system uses a mixing control similar to that shown in FIG. 6a exceppt that the inputs are derived from fore and aft movement of the primary control organ or stick and from a conventional blade pitch or "collective" control lever.

Forward and aft movement of the longitudinal pitch control stick or lever (not shown) is translated into linear movement of push-pull control rod 201 which moves a slider 202 longitudinally back and forth in tract 203. Mounted on slider 202 is a T-shaped bell crank 204 which operates push-pull control rods 207, 209, bell cranks 208, 216 which in turn translate their rotary motion to up and down movement of blade pitch control rods 85 and 89 which are, see FIG. 5, connected to the blade pitch levers 79 and 81 of each of rotor heads of rotors 7 and 9.

As in the case of the prior described system the dimensions of the various bell cranks, particularly including bell crank 204, are such that equal and differential motion is applied to pitch control rods 85 and 89 so that depending on the operation of the longitudinal pitch control lever, the blade pitch will be increased or decreased in a manner to cause the aircraft to pitch nose up and down at the will of the pilot.

Movement of the collective control organ is translated into fore and aft linear movement of the horizontal altitude control rod 210 which movement is transmitted through the system, bell crank 211, push-pull rod 212, simple, first class lever 213, control rod 214 to the base arm 215 of the T-shaped bell crank 204, pivotally mounted on slide 202. Obviously, rocking of the crank 204 about its pivot produces equal simultaneous movement of pitch control rods 85 and 89 whereby the lift of the rotor 7 and rotor 9 are changed by the same amount causing the aircraft to climb or descend.

Obviously, by a combination of cyclic pitch control operation and collective control operation the rate of ascent and descent and the pitch attitude of the craft during these maneuvers is readily determined by the pilot.

Having described a complete control system for manned aircraft, attention is now invited to FIGS. 7 and 8 wherein the described tilting rotor and control system is applied to miniature aircraft. It should be recognized, however, that the two systems are interchangeable in teaching. For example, the drive train system disclosed in FIG. 5 could be used in miniature aircraft while the dual power plant arrangement of FIG. 7 could be used in manned aircraft. As a practical matter, the economics of construction and operation of the particular vehicle, manned or miniature, will dictate which system is used in which environment. It is also noted that in a large manned machine a hydraulically boosted control system would be required in line with control rods 85, 89, 71 and 73 as is the current state of the art in tandem configurations.

In any event, turning to FIG. 7, it will be discerned that the power source for each rotor is an individual engine or motor 250, 250' for each rotor. The engines 250, 250' may be mounted in yokes 251, 251' which are pivotally mounted by any suitable journal means 252, 252' along an axis or axes disposed parallel to each other and the longitudinal axis of the aircraft. The blades 253, 253' of each rotor assembly are pivotally mounted for tilting on drive shafts 254, 254' by means of yokes 255, 255' as is purely conventional in the art. Pitch control of the respective blades 253, 253' is effected through pitch control levers 256, 256' via conventional slide ring structures 257, 257' operated by pitch control rods 258, 258'.

Each of the tiltable yokes 251 251' is also provided with control means in the form of tilt control levers 259, 259' in turn operated, as will be described, by tilt control rods 260, 260'.

The operation of the control system is similar to that disclosed in FIGS. 6a and 6b in that one each pitch to collective and roll to yaw slide control mixer is used. Again, it should be realized that tilting of the rotor heads laterally about the respective tilt axis causes the blades to move through angles α and B because of the aerodynamic damping effect, see FIG. 4 and the preceding descriptive material.

Turning to FIG. 8, it will be seen that two servo motors 265, 266 are substituted for the conventional helicopter controls. The servos are for example, responsive to radio controlled input from a source of multiple frequency output radio waves as is well known in the radio control art. Servo 265 translates a received signal into rotary output of a roll control lever 267 which is connected by control rod 268 to the base arm 273 of T-shaped bell crank 270 which in turn is pivotally mounted on a slide 269 which is linearly moveable to and fro in slide guide 271. The opposite ends 274, 275 of the top bar of T-shaped bell crank are connected to push-pull control rods 276, 277 and via simple bell cranks 278, 279 to the tilt control rods 260, 260' of each rotor.

The servo 266 is of the type to cause slide 269 to move either forwardly or rearwardly responsive to radio signals. As the slide moves, it translates its movement into equal and opposite movement of the rotor tilt control rods whereby the yaw of the aircraft is controlled.

Operation of servo 265 causes rotary motion of lever 267 which in turn translates its motion via control rod 268 to the base arm 273 of bell crank 270 to cause simultaneous and unidirectional operation of the tilt control rods 260, 260' and hence of the rotor heads to control roll of the aircraft. Thus the key to both roll and yaw is the mechanical mixer incorporating the slide 269, the T-shaped bell crank 270 pivotally mounted on the slide. It will be understood that the system shown in FIG. 8 will be duplicated as a pitch to collective mixer blade pitch control of both rotor heads via control arms 258, 258'. It is not believed necessary to duplicate the description, however, since its operation and components are readily apparent from a review of the preceding material by any person skilled in the art.

It should be recognized that although the control function has been described primarily with regard to a two blade, teetering rotor system, the control function and described operation would be equally useable with an articulated rotor and rotors having multiple, i.e., more than two blades, and may have utility with a semi-rigid rotor system provided adaquate servo or boost is incorporated to give sufficient force output.

Having described the invention in detail, it is apparent to persons skilled in the art that various modifications and changes will occur which fall within the spirit and scope of the appended claims, wherein:

What is claimed is:

1. In a tandem helicopter aircraft, a pair of identical sustaining rotors; a pair of tiltable mast means, pivot means including non-rotatable yoke means pivoted to the helicopter air frame on longitudinal axes which are parallel to the longitudinal axis of the aircraft mounting said masts for tilting only about axes parallel to the longitudinal axis of said aircraft; drive means for said rotors, said drive means including rotatable shafts supported at one end by said yoke means for pivotal movement about said parallel axes, each of said rotors being pivotally connected to each of said shaft means for tilting about an axis normal to the axis of rotation of said shaft means, a power source and means connecting each of said shafts to the power source at pivotal axes of said yoke means for transmitting equal power from the power source through said shafts to each of said rotors in any and all positions of said rotors about their respective tilt axes; said connecting means comprising at least one horizontal shaft passing through the yoke means along an axis coincident with the pivotal axis of said yoke means; control means directly connected to said yoke means for tilting each of said entire mast means about their respective tilt axes, to provide control of said aircraft about two axes, yaw, roll and indirectly sideward velocity in all flight modes, said control means including pilot operated control input members operated in the conventional controlling mode, a linearly movable slide means, a rotatable means mounted on said linearly movable slide means, motion transmitting means connected to said linearly movable means providing a linear reciprocative input thereto responsive to manual actuation of a pilot operated input control; motion translating means including said rotatable means whereby said input to the linearly movable means is translated into simultaneous tilting of said masts from side to side in opposite directions responsive to the direction of motion of said linearly movable means, a pilot operated input member connected to said rotatable means carried by said linearly movable slide means whereby said rotatable means may be rotated in either direction, the output from said rotatable means being translated into simultaneous tilting of said masts in the same direction and the sum total of the tilting of said rotor masts is an integrated function of the pilot operated input members, providing inputs to either or both of said linearly moveable slide means or said rotatable means.

2. In a tandem rotor aircraft as defined in claim 1 the improvement comprising a single power source and means for transmitting power from said source simultaneously to each rotor via said tiltable rotatable shafts to rotate same in opposite directions, said means including a pair of parallel shafts passing through said yoke means along axis coincident with the tilt axis thereof to permit said yoke means to laterally tilt about the axis of each shaft and gear means connecting said power transmitting means to the respective shafts whereby said power is continuously delivered to said rotors rotating same in opposite directions in any and all positions and degrees of lateral tilt of said masts.

3. In a tandem rotor aircraft as defined in claim 1, the improvement wherein the input to the control means is derived from radio responsive servos housed with the fuselage of the aircraft.

4. In a tandem rotor aircraft as defined in claim 1 the improvement comprising a further identical linearly moveable slide means and motion translating means including a rotatable means all responsive to input from pilot operated input members functioning in the conventional controlling mode for translating pilot control input into simultaneous and/or differential change of pitch angle of the blades connected to each mast and the fore and aft velocity and rate of ascent or decent of said aircraft.

* * * * *